(12) United States Patent
Hughes

(10) Patent No.: US 9,827,621 B2
(45) Date of Patent: Nov. 28, 2017

(54) CUTTING TOOL INCLUDING A CUTTING INSERT RETAINING AND ADJUSTING MECHANISM

(75) Inventor: Donald R. Hughes, Meadville, PA (US)

(73) Assignee: GREENLEAF TECHNOLOGY CORPORATION, Saegertown, PA (US)

( * ) Notice: Subject to any disclaimer, the term of this patent is extended or adjusted under 35 U.S.C. 154(b) by 961 days.

(21) Appl. No.: 12/401,211

(22) Filed: Mar. 10, 2009

(65) Prior Publication Data

US 2010/0232890 A1    Sep. 16, 2010

(51) Int. Cl.
*B23C 5/24*   (2006.01)
*B23C 5/06*   (2006.01)

(52) U.S. Cl.
CPC .............. *B23C 5/2472* (2013.01); *B23C 5/06* (2013.01); *B23C 5/2444* (2013.01); *B23C 2260/28* (2013.01); *Y10T 407/2288* (2015.01)

(58) Field of Classification Search
CPC ........ B23C 5/06; B23C 5/2472; B23C 5/2444
USPC ............................ 407/36, 41, 34, 37, 46, 39
See application file for complete search history.

(56) References Cited

U.S. PATENT DOCUMENTS

| | | | |
|---|---|---|---|
| 2,385,750 A * | 9/1945 | Weddell | 407/38 |
| 2,690,610 A * | 10/1954 | Begle et al. | 407/36 |
| 2,862,286 A * | 12/1958 | Williams | 407/38 |
| 3,217,384 A * | 11/1965 | Wirfelt | 407/36 |
| 3,229,350 A * | 1/1966 | Yogus | 407/41 |
| 3,434,190 A * | 3/1969 | Kaiser | 407/113 |
| 3,643,310 A * | 2/1972 | Kilbourne et al. | 407/36 |
| 3,739,442 A * | 6/1973 | Lovendahl | 407/37 |
| 3,802,043 A * | 4/1974 | Garih | 407/36 |
| 4,024,615 A | 5/1977 | Lieser | |
| 4,164,380 A | 8/1979 | Peters | |
| 4,428,704 A * | 1/1984 | Kalokhe | 408/156 |

(Continued)

FOREIGN PATENT DOCUMENTS

DE            9017613 U1       3/1991
DE      102007019061 A1 *   11/2008
(Continued)

*Primary Examiner* — Jennifer Swinney
(74) *Attorney, Agent, or Firm* — K&L Gates LLP

(57) ABSTRACT

A cutting tool includes a novel cutting insert retaining and adjusting mechanism. The cutting insert retaining and adjusting mechanism is associated with a recess in the cutting tool and includes a nest slidably mounted in the recess. The nest includes a cutting insert pocket. The cutting insert retaining and adjusting mechanism includes a first wedge adapted to selectively exert pressure on the nest to retain the nest in a desired position in the recess, and a second wedge adapted to selectively exert pressure on a cutting insert positioned in the cutting insert pocket to retain the cutting insert in a desired position. The mechanism further includes an adjustment screw including a first threaded portion and a second threaded portion. The first threaded portion is threadedly disposed in a threaded bore in the cutting tool body, and the second threaded portion is threadedly disposed in a threaded bore in the nest. The first threaded portion has the same handedness but a different thread pitch as the second threaded portion. Rotating the adjustment screw axially slidably advances and retracts the nest in the recess.

15 Claims, 5 Drawing Sheets

(56) References Cited

U.S. PATENT DOCUMENTS

| | | | | |
|---|---|---|---|---|
| 4,575,287 A | * | 3/1986 | Oshnock et al. | 407/41 |
| 4,708,536 A | * | 11/1987 | Sullivan | 407/41 |
| 4,878,787 A | | 11/1989 | Hunt | |
| 5,454,667 A | | 10/1995 | Cirino et al. | |
| 6,702,526 B2 | * | 3/2004 | Gamble et al. | 407/36 |
| 6,789,983 B2 | * | 9/2004 | Mizutani | 407/46 |
| 2009/0297282 A1 | * | 12/2009 | Mizutani | 407/36 |

FOREIGN PATENT DOCUMENTS

| | | | |
|---|---|---|---|
| EP | 0988912 A1 | | 3/2000 |
| GB | 1219333 A | | 1/1971 |
| JP | 63099115 A | * | 4/1988 |
| JP | 2007196357 A | | 8/2007 |

* cited by examiner

CUTTING TOOL INCLUDING A CUTTING INSERT RETAINING AND ADJUSTING MECHANISM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Field of the Invention

The present invention is directed to cutting tools including a mechanism for adjusting replaceable cutting inserts mounted on the cutting tool.

Description of the Invention Background

Most manufactured products contain one or more components manufactured by machining. Often, the machining step or steps produce the components to very precise tolerances. Machining, while one of the most basic and important processes used in manufacturing metal products, also is one of the more expensive. Thus, even modest improvements in the machining process may yield substantial cost savings. The design of the cutting tool is critical to the efficiency by which material can be removed from the workpiece. Thus, substantial sums are spent each year to research and develop improved cutting tools for machining.

A number of machining processes use a rotatable cutting tool. Those processes include milling and boring. In milling, a form is generated in a workpiece by the action of a rotating cutting tool on the workpiece. The cutting tool is called a milling cutter, and such cutters are often constructed to utilize removable and replaceable cutting inserts or tips. Many devices have been used to retain the cutting inserts on the milling cutter body such as, for example, clamps, screws, and wedges. A number of approaches have been developed to allow for adjustment of the position of the cutting edge of the cutting insert in relation to the cutter body of a rotatable cutting tool. Examples of prior art adjustable milling cutters and other adjustable cutters are shown in U.S. Pat. Nos. 4,164,380, 4,428,704, 5,454,667, 6,942,431, and Japanese Pat. 2007-196357.

The present invention is a significant improvement over the prior art in that, for example, it provides a cutting tool or "cutter" having a simplified, rigid construction that allows precise and accurate adjustment of the one or more cutting inserts mounted on the cutter. This feature, in turn, allows for more precise final dimensions on parts being machined.

SUMMARY OF THE INVENTION

According to one aspect of the present disclosure, a cutting tool is provided including a novel cutting insert retaining and adjusting mechanism. Certain embodiments of the cutting tool include at least one recess adapted for mounting a removable cutting insert therein. The cutting insert retaining and adjusting mechanism is associated with the recess and includes a nest slidably mounted in the recess. The nest includes a cutting insert pocket. The cutting insert retaining and adjusting mechanism includes a first wedge adapted to selectively exert pressure on the nest to retain the nest in a desired position in the recess. The cutting insert retaining and adjusting mechanism also includes a second wedge adapted to selectively exert pressure on a cutting insert positioned in the cutting insert pocket to retain the cutting insert in a desired position. The cutting insert retaining and adjusting mechanism further includes an adjustment screw including a first threaded portion and a second threaded portion. The first threaded portion is threadedly disposed in a threaded bore in the cutting tool body, and the second threaded portion is threadedly disposed in a threaded bore in the nest. The first threaded portion has the same handedness but a different thread pitch as the second threaded portion. Rotating the adjustment screw axially slidably advances and retracts the nest in the recess.

In certain non-limiting embodiments of the cutting tool, the first threaded portion and the second threaded portion of the adjustment screw have different diameters. For example, the diameter of the first threaded portion can be greater than the diameter of the second threaded portion.

BRIEF DESCRIPTION OF THE DRAWINGS

The advantages of the present invention may be better understood by reference to the accompanying drawings in which.

Figure 1:
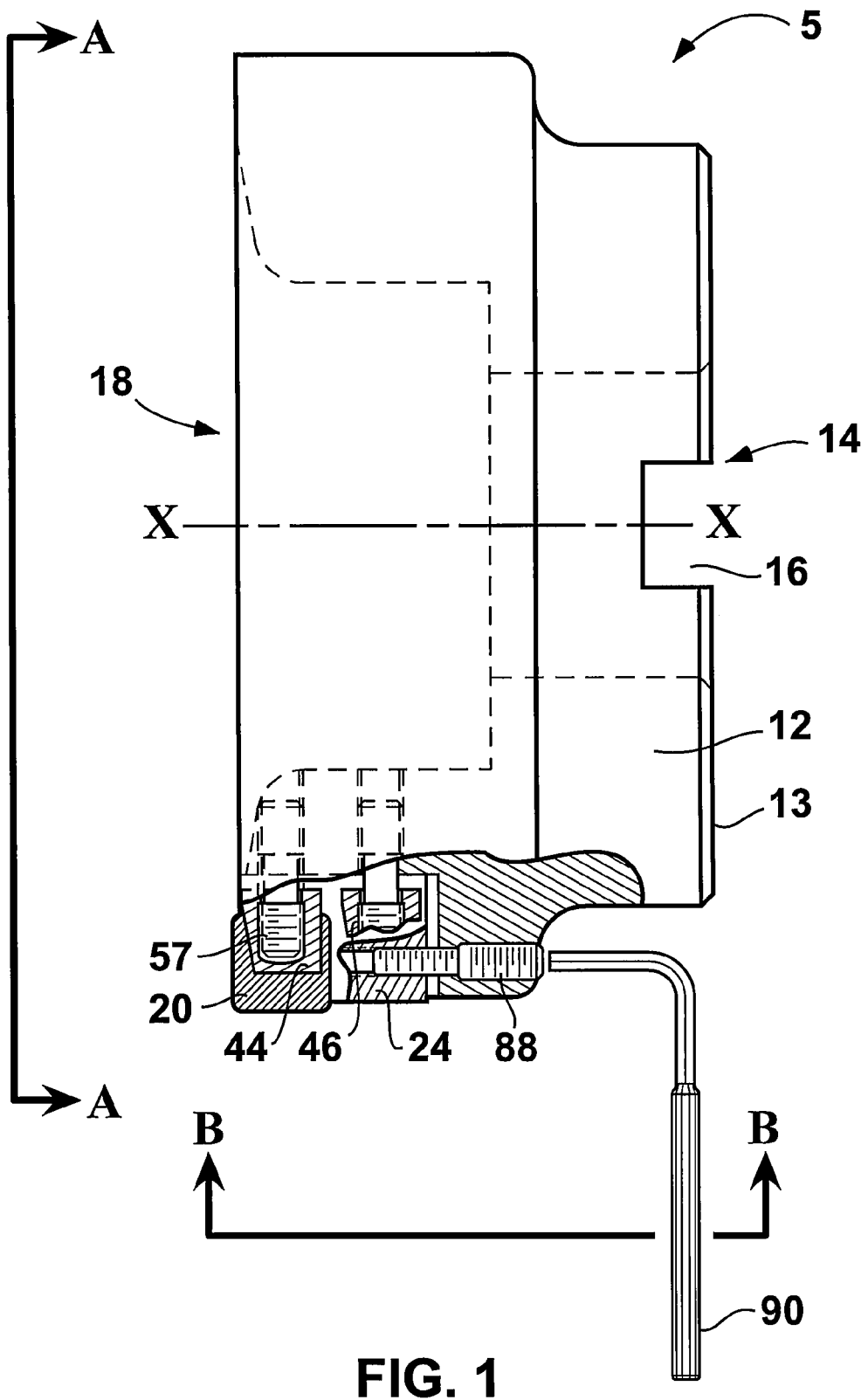
FIG. 1 is a schematic semi-transparent side view of one non-limiting embodiment of a milling cutter constructed according to the present disclosure, illustrating one of the cutting insert retaining and adjusting mechanisms of the milling cutter, and further illustrating a wrench used to adjust the mechanism.

The reader will appreciate the foregoing details, as well as others, upon considering the following detailed description of certain non-limiting embodiments of mechanisms according to the present disclosure. The reader also may comprehend certain of such additional details upon carrying out or using the subject matter described herein.

DETAILED DESCRIPTION OF THE INVENTION

In the present description of non-limiting embodiments, all numbers expressing characteristics of elements are to be understood as being modified in all instances by the term "about". Accordingly, unless indicated to the contrary, any numerical parameters set forth in the following description are approximations that may vary depending upon the desired properties one seeks to obtain. At the very least, and not as an attempt to limit the application of the doctrine of equivalents to the scope of the claims, each numerical parameter should at least be construed in light of the number of reported significant digits and by applying ordinary rounding techniques.

The present disclosure provides an improved cutting tool including a novel cutting insert retaining and adjusting mechanism for retaining and adjusting the one or more cutting inserts mounted on the cutting tool. The improved cutting tool of the present disclosure can be understood by reference to the non-limiting embodiment of a milling cutter shown in FIGS. 1 through 5. FIGS. 1 through 5 show a multi-insert milling cutter 5 having a cylindrical cutter body 10 adapted to be mounted on a milling machine and rotated about axis "X". Cutter body 10 is preferably made of an alloy steel such as, for example, AISI Type 4150 steel. Other alloys suitable for use in cutter body 10 will be apparent to those having ordinary skill in the art. Body 10 may have a reduced diameter portion 12 at its inward end. The inward face 13 of cutter body 10 is machined as a flat locating surface adapted to be drawn tightly into contact with the spindle face or rotary toolholder on a milling machine (not shown) using a suitable attachment mechanism known in the art. A central bore 14 provided in the reduced diameter portion 12 is accurately machined and sized to fit a suitable arbor (not shown) of the milling machine. A notch 16 is formed in the inward face 13 and is positioned to accommodate a drive key (not shown). A larger central bore 18 is provided in the outward end of the body 10 to reduce weight of the milling cutter 5, facilitate manufacturing, and accommodate, for example, an arbor screw or other fastening mechanisms.

Figure 2:
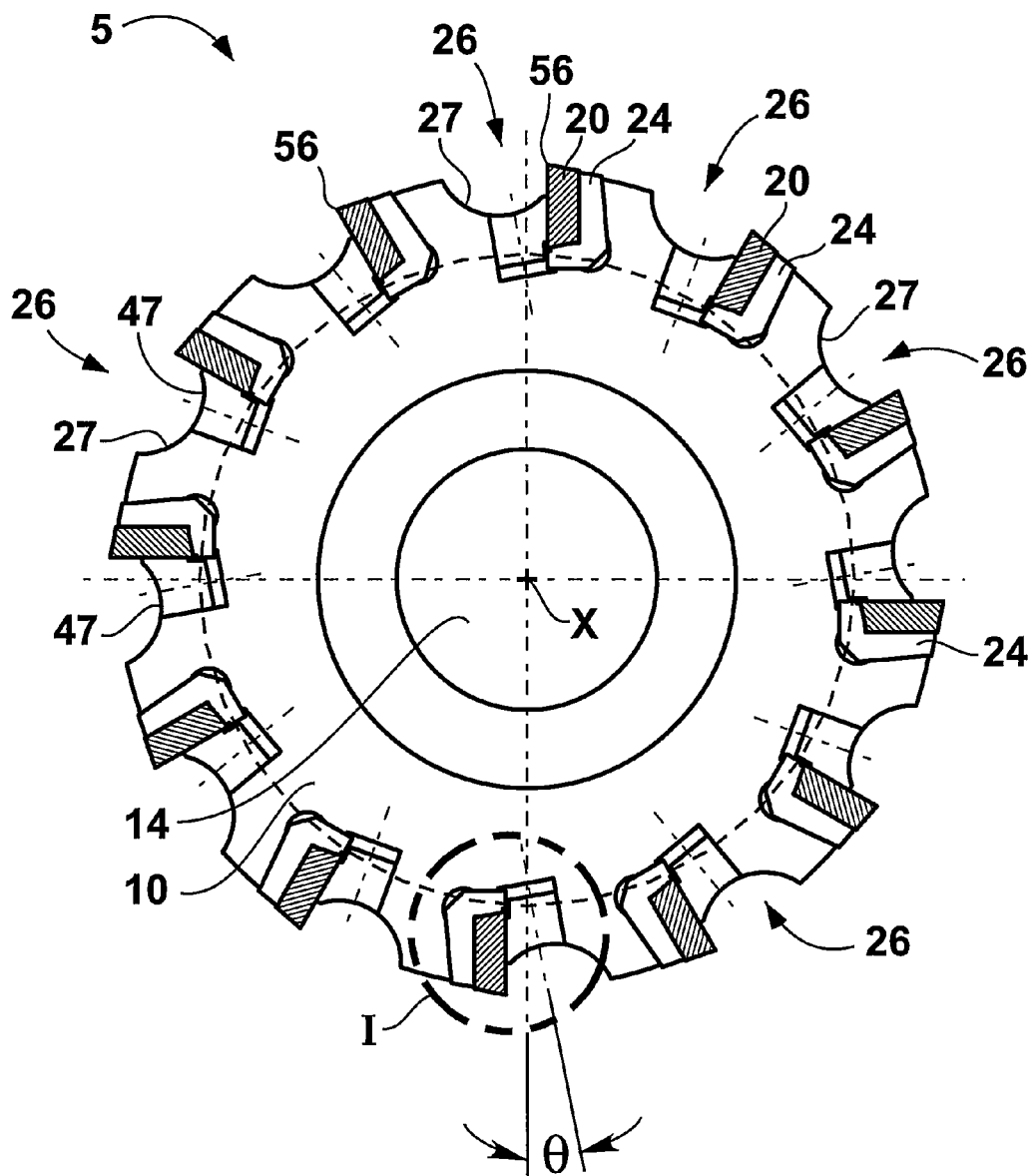
FIG. 2 is a schematic front elevational view of the milling cutter embodiment shown in FIG. 1, taken in the direction of arrows A-A in FIG. 1.

The cutter body 10 is designed so that a plurality of (i.e., two or more) cutting inserts 20 may be mounted about its outer periphery, as shown in FIG. 2. Although milling cutter 5 is depicted as including twelve cutting inserts 20 about its periphery, it will be understood that the novel mechanism according to the present disclosure may be adapted for use with a milling cutter, a boring tool, or other suitable tool including any number of replaceable cutting inserts. The number of inserts accommodated by the milling cutter 5, for example, may be varied according to the diameter and desired use of the milling cutter. Inserts 20 may have one or more cutting edges and may be, for example, standard or specially designed indexable inserts made of cemented carbide, ceramic, cermet, or another of the various suitable materials known in the art. Each insert 20 is retained in an insert pocket 22 formed in an insert retaining element in the form of a nest 24. The nest 24 is retained in a recess 26 formed in the cutter body 10. Recesses 26 are preferably equally spaced about the outer periphery of the cutter body 10, for example, as shown in FIG. 2. Recess 26 is typically provided with a chip clearance groove 27 as shown in FIG. 2 to allow for free flow of chips during machining.

Figure 3:
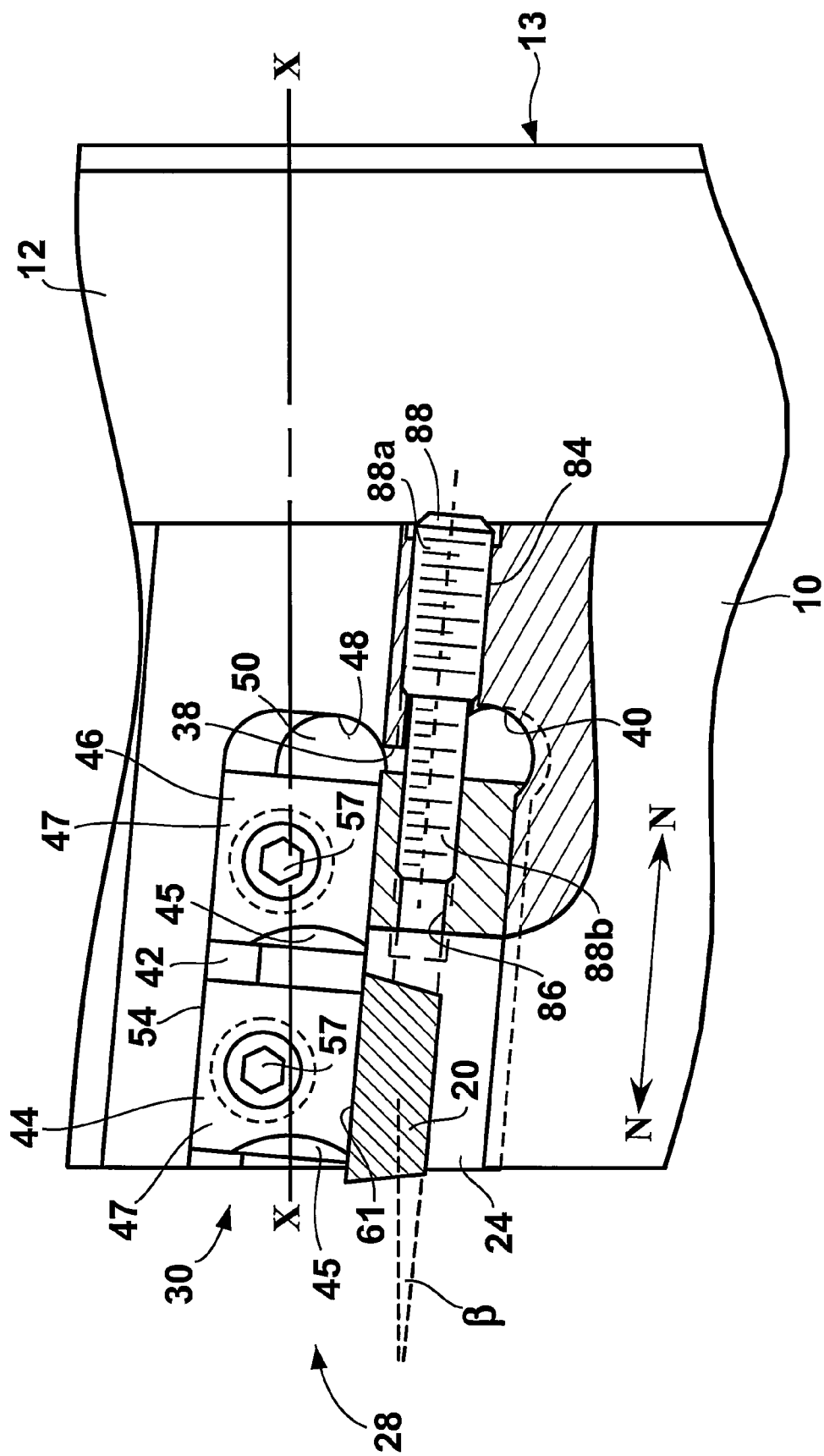
FIG. 3 is a schematic partial semi-transparent side view of the milling cutter and the cutting insert retaining and adjusting mechanism shown in FIG. 1, wherein the view is taken from an orientation rotated 90 degrees from the orientation in FIG. 1 and in the direction of arrows B-B in FIG. 1.
Figure 5:
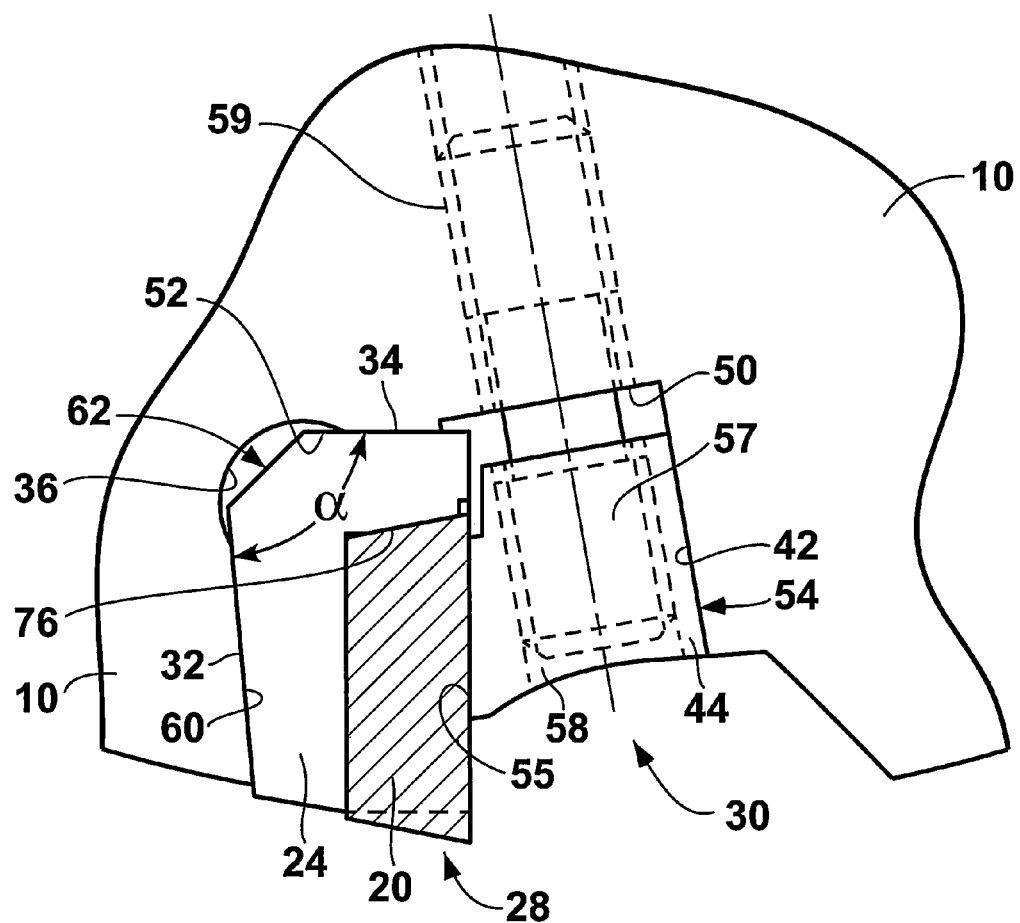
FIG. 5 is a schematic partial frontal view of a single recess "I" and its associated insert retention/adjusting mechanism in the milling cutter embodiment shown in FIG. 1, showing the wedge screw in phantom.

FIG. 5 is a detailed view in isolation of the recess 26 labeled "I" in FIG. 2 and is taken from the same perspective as in FIG. 2. The recess 26 shown in FIG. 5 is representative of the construction of each of the recesses 26 of the milling cutter 5. FIG. 3 is a partial fragmentary view of the representative recess 26 shown in FIG. 1, wherein the orientation in FIG. 1 has been rotated 90 degrees about axis X-X and the recess 26 is viewed in the direction of arrows B-B in FIG. 1. As indicated in FIGS. 3 and 5, each recess 26 includes a nest retaining portion 28 (in which the nest 24 is positioned and retained) and a retaining mechanism portion 30 (in which components of the milling cutter's retaining and adjusting mechanism are disposed).

As shown in FIG. 5, the nest retaining portion 28 includes planar locating surfaces 32 and 34 constructed to support and locate a nest 24 in a recess 26 in the cutter body 10. Locating surfaces 32 and 34 are preferably positioned at a slightly acute angle $\alpha$ (see FIG. 5) with respect to each other to help retain the nest 24 in the recess 26. In certain non-limiting embodiments of the milling cutter 5, the angle $\alpha$ is preferably in the range of 75° to 88°, and more preferably is 80°. An undercut 36 is preferably provided where locating surfaces 32 and 34 would otherwise intersect. The undercut 36 facilitates accurate manufacture of the locating surfaces 32 and 34 and prevents possible contact of the corner of the nest 24 with the locating surfaces 32 and 34 in a manner that would prevent precise positioning of the nest 24 with the recess 26. The locating surfaces 32 and 34 are constructed to allow the nest 24 to slide axially in both an inward direction (i.e., toward inward face 13) and an outward direction (i.e., away from inward face 13). Locating surfaces 32 and 34 may be oriented at an angle $\beta$ with respect to the axis of the cutter body 10. For example, FIG. 3 shows a line extending from the plane of locating surface 32 and a line parallel to axis X-X intersecting at the angle $\beta$. The angle $\beta$ is preferably in the range of 1 to 8 degrees, and more preferably is 5 degrees.

The nest retaining portion 28 includes a back wall 38, shown in FIG. 3, positioned axially inwardly in the cutter body 10, to allow for axial adjustment (i.e., adjustment in a direction toward or away from inward face 13) of the nest 24 through movement of the nest 24 on the locating surfaces 32 and 34. The direction of possible axial movement of nest 24 is indicated by the arrow N-N in FIG. 3. An undercut 40 is preferably provided at the bottom of back wall 38 to facilitate accurate manufacture of back wall 38.

As best shown in FIGS. 2, 3, and 5, retaining mechanism portion 30 of the recess 26 includes a side wall 42 positioned radially at an angle $\theta$ to the radius of the cutter body 10 (indicated in FIG. 2) and constructed to engage one wall of each of two r elements in the form of wedges 44 and 46. The angle $\theta$ is preferably in the range of 8 to 15 degrees, and more preferably is 10 degrees. As illustrated in FIG. 3, retaining mechanism portion 30 preferably extends axially into the cutter body 10 to a point slightly beyond the length of desired sliding axial adjustment of the nest 24. Retaining mechanism portion 30 is preferably formed in cutter body 10 using a small diameter end mill which, after machining, leaves a curved wall 48 at the inward end of retaining mechanism portion 30. As shown in FIG. 5, the bottom wall 50 of retaining mechanism portion 30 is preferably flat and perpendicular to side wall 42 and extends slightly below locating surface 34 of the nest retaining portion 28. As further shown in FIG. 5, the bottom wall 50 preferably also extends beyond the upper end of the inner side wall 52 of nest 24 so that the upper end of the wall 52 does not contact the locating surface 34.

With reference to FIGS. 3 and 5, wedge 44 is located forward in the retaining mechanism portion 30 of recess 26 and is adapted to secure cutting insert 20 in insert pocket 22 of nest 24. Wedge 46 is located inwardly (see FIG. 3) in the retaining mechanism portion 30 of recess 26 and is adapted to exert pressure on and secure nest 24 in the nest retaining portion 28 of recess 26. When nest 24 is fixed in the desired position in the nest retaining portion 28, cutting insert 20 may be indexed or replaced by loosening wedge 44 to relieve pressure on the cutting insert 20, without the need to also loosen wedge 46. Once insert 20 is indexed or a new insert is disposed in insert pocket 22 of nest 24, the cutting insert will be in an orientation identical to the cutting insert 20 prior to indexing or replacement, and may be secured in position by tightening wedge 44.

Wedges 44 and 46 each include a back wall 54 adapted to engage side wall 42 of retaining mechanism portion 30, and a front wall 55 opposite back wall 54. Front wall 55 of wedge 44 is adapted to engage a top surface 61 of cutting insert 20 when the cutting insert 20 is disposed in the insert pocket 22 of nest 24. Front wall 55 of wedge 46 is adapted to engage a side wall 52 of nest 24 when the nest is disposed in the nest retaining portion 28. Front wall 55 of wedge 44 is preferably sized so that it provides contact on the top surface of insert 20 over an area sufficient to provide adequate clamping or wedging pressure to ensure positive retention, but without contacting the upper surface of the cutting insert 20 at a point at or near the cutting edges 56 located around the periphery of the cutting inserts 20. The wedges 44 and 46 may have an identical design so as to be interchangeable and simplify manufacture and stocking of inventory. As shown in FIG. 3, the wedges 44 and 46 may include reliefs 45 on a forward top side to accommodate chip flow. Wedges 44 and 46 are typically provided with a top surface 47 that is curved with a radius similar to the radius of chip clearance groove 27 such that when edges 44 and 46 are tightened, there is a substantially smooth radiused path for chip flow As illustrated for wedge 44 in FIG. 5, wedges 44 and 46 are actuated to exert or relieve clamping or wedging pressure by threaded advancement and retraction of differential screws 57. As further indicated in FIG. 5, each differential screw 57 extends through a threaded bore 58 in the wedge 44 and 46 and into a threaded bore 59 in the bottom wall 50 of the retaining mechanism portion. It will be understood that that other types of screws also may be used to actuate wedges 44 and 46.

Figure 4:
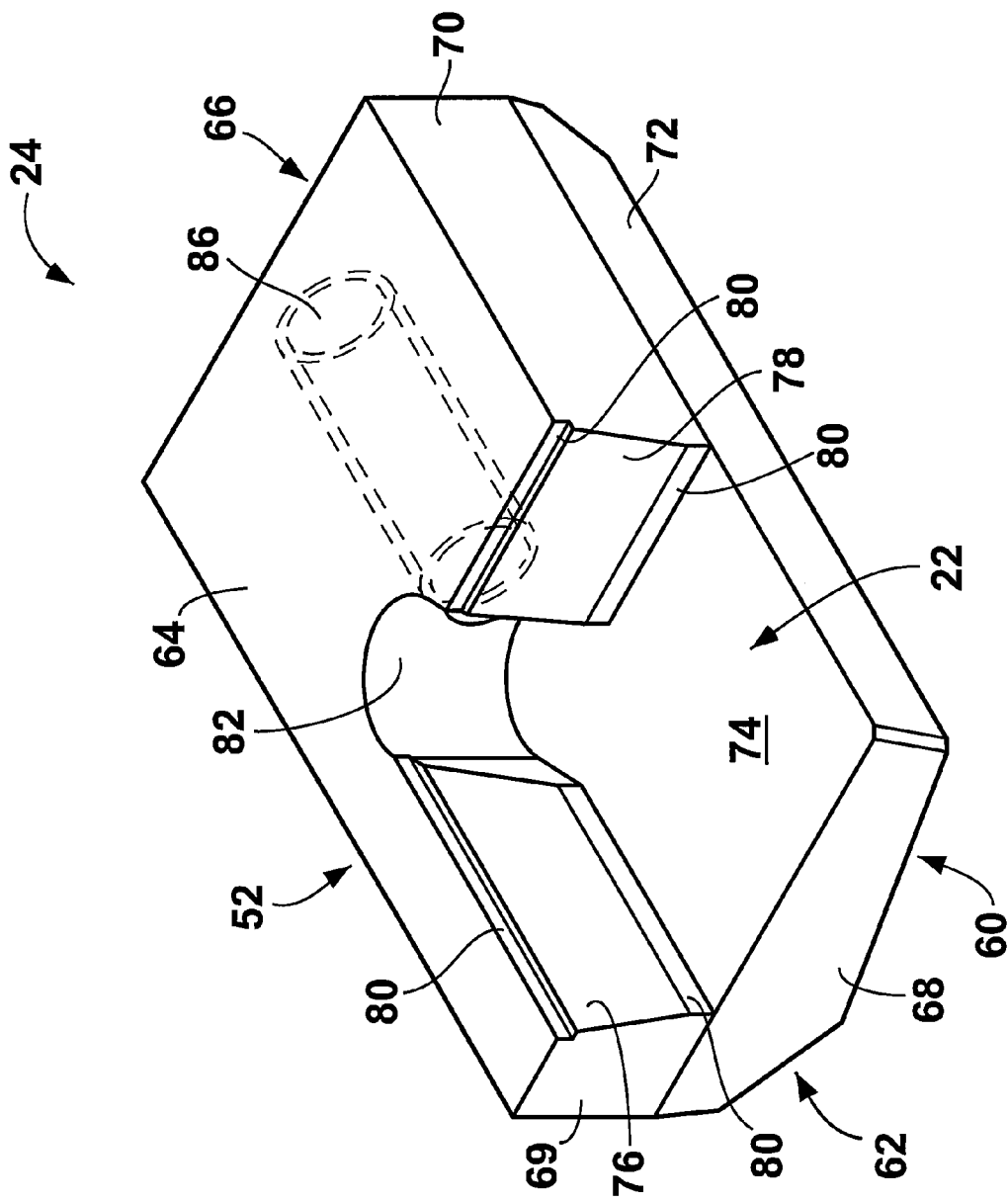
FIG. 4 is a schematic semi-transparent perspective view of a nest included in the milling cutter embodiment shown in FIG. 1.

Referring to FIG. 4, nest 24 includes an inner side wall 52 adapted to engage and slidably move along locating surface 34 of the nest retaining portion 28 of recess 26, and a bottom wall 60 adapted to engage and slidably move along locating surface 32 of nest retaining portion 28 of recess 26. Intermediate wall 62 extends between and at an angle to inner side wall 52 and bottom wall 60 such that inner side wall 52 and bottom wall 60 do not intersect, but rather provide an area where the bottom inner corner of nest 24 is spaced from and does not contact undercut 36 when the nest 24 is mounted in the cutter body 10 (see FIG. 5). The inner side wall 52 and bottom wall 60 are formed at a slightly acute angle with respect to each other, and that angle is the same as angle α between locating surfaces 32 and 34 so that the nest 24 firmly seats against both of walls 32 and 34. Nest 24 is preferably made of a suitable alloy steel.

Referring to FIG. 4, the nest 24 includes a top wall 64, a back wall 66, a front wall 68, a clearance wall 69 above the front wall 68, an upper outer side wall 70, and a lower outer side wall 72. The inner side wall 52 and the upper outer side wall 70 are preferably parallel to each other. The lower outer side wall 72 may be formed with a slight clearance angle, the size of which is dependent upon the diameter of cutter body 10 and the style of insert being used. For most applications, the clearance angle is in the range of 0 to 20 degrees.

An insert pocket 22 is formed in the upper portion of nest 24, intersecting the top wall 64. The size and shape of insert pocket 22 will be determined by the size and shape of the cutting insert 20 selected to be used in the milling cutter 5. Different nests having the same peripheral shape and outside dimensions can be constructed to accommodate cutting inserts of different shapes and sizes. Those nests can be accommodated by the same nest retaining portion 28 in a single cutter body 10. In this way, a set (i.e., a plurality) of cutting insert nests constructed to accommodate a variety of cutting inserts having different shapes and sizes can be developed for a single milling cutter or other cutting tool. The cutting inserts 20 shown in the accompanying drawings include generally square-shaped top and bottom faces and have a positive rake (i.e., the sides of the cutting insert form an acute angle with the top face of the cutting insert). However, it will be understood that the cutting insert retaining and adjusting mechanism according to the present disclosure may be adapted for use with any suitably shaped cutting insert Insert pocket 22 includes a substantially flat bottom surface 74 adapted to contact and support the bottom of a cutting insert 20. Insert pocket 22 further includes side walls 76 and 78 adapted to engage adjacent side walls of cutting insert 20, thereby establishing the position of the cutting insert 20 relative to the nest 24 and the cutter body 10 when the nest 24 is mounted in the nest retaining portion 28 of a recess 26 of the cutter body 10. In the non-limiting embodiment of a nest 24 shown in the appended figures, the pocket side walls 76 and 78 are formed at an angle upward and outward from the bottom surface 74, and the angle corresponds to the positive rake angle of the sides of cutting insert 20. These corresponding angles are shown in FIG. 3 for side wall 78, and in FIG. 5 for side wall 76. It will be understood, however, that the side walls 76 and 78 may be perpendicular to the bottom surface 74 of the nest 24 if negative rake cutting inserts are used in the milling cutter 5. The pocket side walls 76 and 78 are formed with small undercuts 80 at the top and bottom of those walls to facilitate manufacture, prevent contact with the cutting insert at or near the cutting edges 56, and more accurately position the cutting insert 20 in the insert pocket 22 (which can be especially important when indexing a cutting insert that has build-up that may otherwise interfere with accurate positioning). An undercut 82 also is preferably provided where pocket side walls 76 and 78 would otherwise intersect to facilitate accurate manufacture of the side walls 76 and 78 and prevent possible contact of the corner of the cutting insert 20 with the side walls 76 and 78 in a manner that would prevent precise positioning of the cutting insert 20 in the nest 24.

Cutter body 10 includes a threaded bore 84 associated with each recess 26 that extends axially and inwardly from the back wall 38 of the nest retaining portion 28 of the recess 26 and completely through the cutter body 10. Threaded bore 84 is parallel to and spaced from the locating surfaces 32 and 34. Each nest 24 is formed with a threaded bore 86 extending from the back wall 66 of the nest 24 to the area of the undercut 82 in the insert pocket 22, parallel to and spaced from the inner side wall 52. The position of the threaded bore 86 is indicated by dashed lines in the sectioned portion of FIG. 3, and by dashed lines in FIG. 4. The threads of threaded bore 86 need not extend completely to the undercut 82. As illustrated in the sectioned portion of FIG. 3, threaded bore 86 is positioned such that it is axially aligned with a corresponding threaded bore 84 in the back wall 38 of the nest retaining portion 28 of recess 26 when the nest 24 is slidably mounted in the nest retaining portion 28 of the cutter body 10. The threads of threaded bores 84 and 86 have the same handedness, and the pitch of the threads in bores 84 and 86 differs. Threaded bores 84 and 86 are preferably formed with a fine pitch, such as pitch designated UNF (Unified Fine Thread) in the United States.

With reference to FIG. 3, an adjustment screw 88 is simultaneously threadedly disposed in threaded bores 84 and 86. Adjustment screw 88 is formed with threaded portions at opposite ends thereof, and the threaded portions correspond in diameter and pitch to the threads in threaded bores 84 and 86. The threaded portions are also preferably formed with a fine pitch, such as designated UNF in the United States. As depicted in FIG. 3, adjustment screw 88 is preferably formed with a large diameter threaded end 88*a* and a smaller diameter threaded end 88*b*. Threaded bore 84 preferably has a diameter that is large enough to allow the small diameter end 88*b* of adjustment screw 88 to pass through the threaded bore 84 during assembly of the components without damaging the threads of either the threaded bore 84 or the screw 88.

Large diameter end 88*a* and small diameter end 88*b* of adjustment screw 88, respectively, are formed with a diameter and pitch corresponding to that of the threaded bores 84 and 86 and are threaded into threaded bores 84 and 86, as shown in FIGS. 1 and 3. The fit between the threads of the screw 88 and threaded bores 84 and 86 is preferably within tolerance class 2 of the Unified Screw Thread Standard Series. In the preferred embodiment, threaded bore 84 is formed with a slightly oversized tap to allow for possible slight misalignment of threaded bores 84 and 86 after assembly due to manufacturing tolerances for the nest 24 and cutter body 10. After assembly, when the adjustment screw 88 is rotated by a suitable wrench, such as Allen Wrench 90 shown in FIG. 1, the nest 24 and the cutting insert 20 mounted therein will move axially along locating surfaces 32 and 34 and the position of the cutting edge 56 will be adjusted axially with respect to the cutter body 10.

In one non-limiting embodiment according to the present disclosure, the threaded bore 84 is formed with a #10-32 right hand thread, and the threaded bore 86 is formed with a #6-40 right hand thread. Typically, a 0.003" (on diameter) oversize #10-32 tap is sufficient to provide for possible misalignment between threaded bores 84 and 86. The large diameter end 88*a* of the adjustment screw 88 is formed with a #10-32 right hand thread, and the small diameter end 88*b* of the adjustment screw 88 is formed with a #6-40 right hand thread on the other end. When the nest 24 and the adjustment screw 88 are mounted in the cutter body 10 as shown in FIG. 3, one clockwise revolution of the adjustment screw 88 will cause the screw to travel 0.0312" axially outwardly (i.e., in a direction away from inward face 13). That same single clockwise revolution of the adjustment screw 88 will cause the nest 24 to travel 0.025" axially inwardly (i.e., in a direction toward inward face 13). The combined total movement of the adjustment screw 88 and the nest 24 resulting from one clockwise revolution of the adjustment screw 88 is 0.0062" in the outward direction which, relative to conventional designs, is an extremely fine cutting insert adjustment. Rotation of the adjustment screw 88 less than one full revolution will provide even finer adjustment. Accordingly, the unique mechanism described in the present disclosure allows for very precise location and very fine adjustment of cutting inserts in milling cutters, boring tools, and other cutting tools, thereby providing for more accurate dimensions in finishing operations.

One possible manner of using the milling cutter 5 illustrated in FIG. 1-5 is as follows. The milling cutter 5 is first assembled with a nest 24 in the nest retaining portion 28 of each recess 26. Adjustment screws 88 are inserted and each nest 24 is positioned close to the end of the cutter body 10. Wedges 44 and 46 with their associated differential screws 57 are inserted in the retaining mechanism portion 30 of the recesses 26. The milling cutter 5 is mounted on a set up fixture having an indicator gauge. A cutting insert 20 is placed in a pocket 22 of a nest 24 and manually snugged up against pocket side walls 76 and 78. The milling cutter 5 is rotated on the fixture until the axially outwardmost cutting edge 56 of the cutting insert 20 contacts the indicator gauge of the fixture. The adjustment screw 88 is then rotated in the appropriate direction until the desired position is accurately indicated. Wedge 46 is then tightened to retain the nest 24, and then wedge 44 is tightened to retain the cutting insert 20 in the final desired position. The milling cutter 5 is then rotated on the fixture until the next recess 26 is adjacent to the indicator gauge, and the process is repeated. The process is repeated until all of the cutting inserts 20 are accurately positioned and securely retained in each recess 26.

The present invention provides a unique and advantageous way to set face runout on face milling cutters essentially to 0. Each nest and its associated cutting insert may easily be adjusted in either an inward or outward direction by simply loosening the wedges associated with the cutting insert and then rotating the adjustment screw associated with the recess in the appropriate direction. The use of an adjustment screw having threaded ends with different pitches and the same handedness allows for very small incremental movement of the cutting insert cutting edge for each full or partial revolution of the adjustment screw. The very small incremental movement of the cutting edge possible by the design according to the present disclosure is a substantial improvement as it allows the operator doing the cutting tool setup to move the cutting edge very slowly. Therefore, it is much less likely that the operator will overshoot the final desired setting, which is often done in cutting tool set up using existing cutting tool designs. In addition, if an operator using the unique design described herein does overshoot the desired cutting insert setting, the operator may easily back off the cutting edge by rotating the adjustment screw in the reverse direction.

Although the above description of non-limiting embodiments according to the present disclosure has focused on milling cutters, one having ordinary skill, after reviewing the present disclosure, may readily adapt the cutting insert retaining and adjusting mechanism to other cutting tools including one or more replaceable cutting inserts mounted thereon. In addition to face milling applications requiring fine axial adjustments, the present invention can also be utilized in boring applications in which fine radial adjustments are required. For example, the retaining and adjusting mechanism, including a nest, adjustment screw and wedges, can be mounted in a recess located on a side of a boring tool. The adjusting mechanism according to the present disclosure provides an alternative to more complex micro adjustment boring units currently utilized in the metalworking industry Although the present disclosure has necessarily only presented a limited number of embodiments according to the present disclosure, it will be understood that the present disclosure and associated claims are not so limited. Those having ordinary skill will readily identify additional applications of the design described herein that are within the spirit of the necessarily limited number of embodiments discussed herein. It is understood, therefore, that the present invention is not limited to the particular embodiments disclosed herein, but is intended to cover modifications that are within the principle and scope of the invention, as defined by the claims. It will also be appreciated by those skilled in the art that changes could be made to the embodiments above without departing from the broad inventive concept thereof.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. Also, it is to be understood that the figures and descriptions of the embodiments herein have been simplified to illustrate elements that are relevant for a clear understanding of the embodiments, while eliminating, for purposes of clarity, other elements.

What is claimed is:

1. A cutting tool comprising:
   a cutting tool body including at least one recess adapted for mounting a removable cutting insert therein, the recess including two locating surfaces positioned at an acute angle relative to each other; and
   a cutting insert retaining and adjusting mechanism associated with the recess and including,
      a nest slidably mounted in the recess, the nest including a single cutting insert pocket, wherein the nest further includes a side wall and a bottom wall positioned at an acute angle relative to each other and that engage and slidably move along the two locating surfaces of the recess when the nest is slidably mounted in the recess, wherein only the side wall and the bottom wall of the nest contact the recess of the cutting tool body,
      a first wedge adapted to selectively exert pressure on the nest and retain the nest in a desired position in the recess,
      a second wedge adapted to selectively exert pressure on a cutting insert positioned in the cutting insert pocket and retain the cutting insert in a desired position, and
      an adjustment screw having a first threaded portion and a second threaded portion, the first threaded portion threadedly disposed in a threaded bore in the cutting tool body, the second threaded portion threadedly disposed in a threaded bore in the nest, wherein the first threaded portion has the same handedness but a different thread pitch as the second threaded portion, wherein rotation of the adjustment screw axially slidably linearly advances and retracts the nest in the recess, and wherein the adjustment screw only threadedly engages the cutting tool body and the nest.

2. The cutting tool of claim 1, wherein the first threaded portion and the second threaded portion have different diameters.

3. The cutting tool of claim 2, wherein the diameter of the first threaded portion is greater than the diameter of the second threaded portion.

4. The cutting tool of claim 1, wherein the first threaded portion and the second threaded portion have a fine pitch.

5. The cutting tool of claim 1, wherein one of the first threaded portion and the second threaded portion includes a #6-40 thread and the other of the first threaded portion and the second threaded portion includes a #10-32 thread.

6. The cutting tool of claim 1, wherein the cutting tool is one of a milling cutter and a boring tool.

7. The cutting tool of claim 1, wherein the cutting insert pocket of the nest includes at least three surfaces which are each contacted by surfaces of a cutting insert disposed in the cutting insert pocket of the nest.

8. The cutting tool of claim 1, wherein the nest is adapted to accommodate a cutting insert shape having a predetermined shape and size.

9. The cutting tool of claim 8, wherein the nest is removable and replaceable with a different nest adapted to accommodate a cutting insert having a different predetermined shape and size.

10. The cutting tool of claim 1, wherein the first wedge includes a screw that is rotatable to selectively exert pressure on the nest.

11. The cutting tool of claim 1, wherein the second wedge includes a screw that is rotatable to selectively exert pressure on a cutting insert disposed in the cutting insert pocket of the nest.

12. The cutting tool of claim 1, wherein;
    the adjustment screw includes a first threaded portion and a second threaded portion, wherein a diameter of the first threaded portion is greater than a diameter of the second threaded portion; and
    the threaded bore in the cutting tool body has a diameter greater than the diameter of the second threaded portion of the adjustment screw.

13. The cutting tool of claim 1, wherein:
    the nest is adapted to accommodate a cutting insert having a predetermined shape and includes at least three surfaces which are each contacted by surfaces of the cutting insert disposed in the cutting insert pocket of the nest;
    the diameter of the first threaded portion is greater than the diameter of the second threaded portion;
    the first wedge includes a screw that is rotatable to selectively exert pressure on the nest; and
    the second wedge includes a screw that is rotatable to selectively exert pressure on a cutting insert disposed in the cutting insert pocket of the nest.

14. The cutting tool of claim 13, wherein the cutting tool is one of a milling cutter and a boring tool.

15. The cutting tool of claim 1, wherein the side wall and the bottom wall of the nest are positioned relative to one another at an acute angle in the range of 75 to 88 degrees.

* * * * *